Oct. 13, 1936.  L. M. PERSONS  2,057,308
COMBINED THERMOSTAT AND TIMER CONTROL FOR BURNERS
Filed Oct. 29, 1934
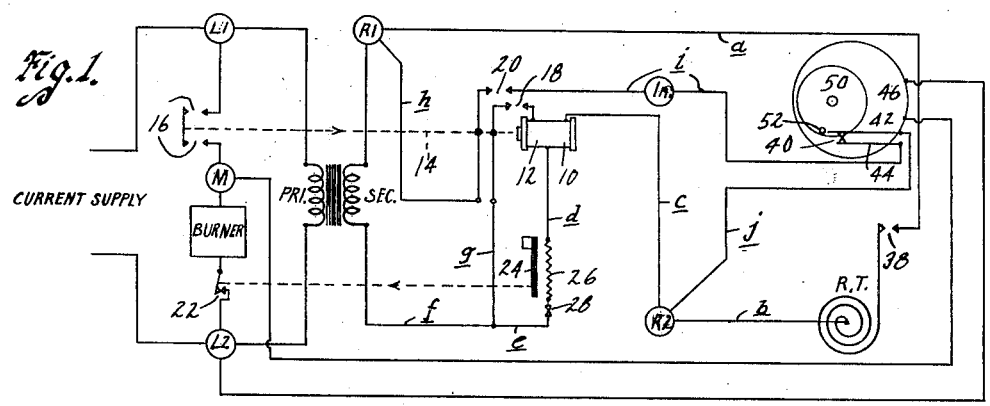
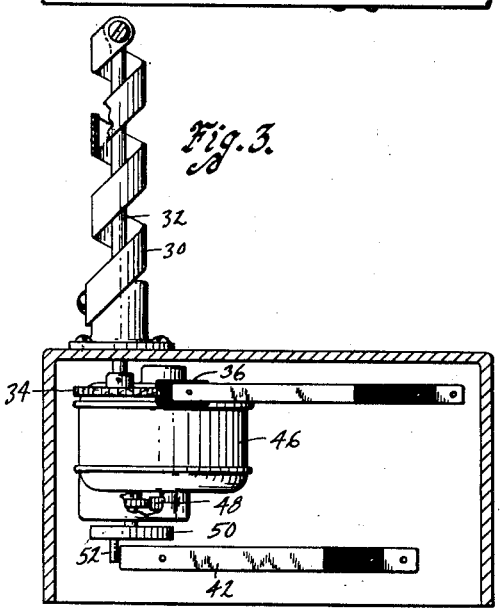
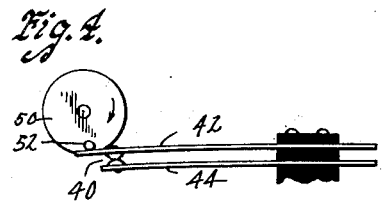
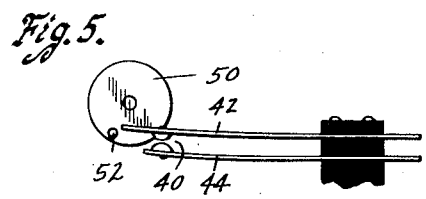
Witness
H. S. Mumgenmaier
Inventor
~ Lawrence M. Persons ~
By Bair, Freeman & Sinclair
Attorneys Patented Oct. 13, 1936

2,057,308

UNITED STATES PATENT OFFICE 2,057,308

COMBINED THERMOSTAT AND TIMER CONTROL FOR BURNERS

Lawrence M. Persons, Des Moines, Iowa, assignor to Penn Electric Switch Co., Des Moines, Iowa, a corporation of Iowa Application October 29, 1934, Serial No. 750,494

7 Claims. (Cl. 236—78)

An object of my present invention is to provide a room thermostat controlled burner capable of using a room thermostat of very slight differential without danger of damaging the contacts therein, the mechanism for accomplishing this purpose being comparatively simple and inexpensive to manufacture.

A further object is to provide a room thermostat for controlling a burner and a means for maintaining the burner circuit energized as long as the room thermostat is closed but operable to break the burner circuit through contacts other than the room thermostat after the room thermostat contacts have separated.

More particularly it is my object to provide a room thermostat controlling a relay which in turn energizes and deenergizes a burner, relay closed contacts and periodically operated interrupter contacts in series with each other and shunting the room thermostat whereby breakage of the circuit for the relay occurs at the interrupter contacts rather than at the room thermostat contacts, yet the room thermostat is the initial controlling factor for the relay.

Still a further object is to provide a room thermostat circuit as described in connection with a combustion operated lock-out switch of usual construction.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is an electro-diagrammatic view of the combined thermostat and timer control for burners embodying my invention.

Figure 2 is a front elevation of a combustion switch and interrupter used in my controller, the cover being removed.

Figure 3 is a sectional view on the line 3—3 of Figure 2; and

Figures 4 and 5 are views of the interrupter showing different positions in the operation thereof.

On the accompanying drawing I illustrate a relay coil 10 and a holding coil 12, both of which can be wound on the same core and which, when either or both are energized, attract an armature 14. Upon the armature 14 being attracted it closes burner contacts 16, holding contacts 18 and interrupter holding contacts 20.

Lock-out or safety contacts 22 are illustrated which are separable after a time period by warping of a bimetal element 24 caused by heat radiated from a heater 26. For controlling the heater 26 combustion switch contacts 28 are provided.

The contacts 28 are operated by a bimetal coil 30 subjected to the heat of combustion such as by being inserted in the chimney from a furnace. The bimetal coil 30 rotates a rod 32 which in turn rotates a ratchet wheel 34 engaging an extension 36 on one end of a leaf spring which carries one of the contacts 28.

The operation of the combustion switch and also the safety switch consisting of the elements 22, 24 and 26 is fully explained in the co-pending application of Abraham L. Rubel, Serial No. 693,800.

Terminals $L^1$ and $L^2$ are shown with which a current supply may be connected. A terminal M is also provided for convenience in connecting the burner in the circuit. Terminals $R^1$ and $R^2$ are provided for a room thermostat R. T. having contacts 38.

A sixth terminal In. is provided and between this terminal and the terminal $R^2$ interrupter contacts 40 are connected. The interrupter contacts are carried by leaf springs 42 and 44 which are so mounted that the contacts 40 normally lightly engage each other, as in Figure 2. A motor 46, having step-down gearing of any suitable sort indicated at 48 terminating in a disc 50, is shown. The disc 50 carries a pin 52 adapted to engage the spring 42 as in Figure 4 when the disc rotates and to snap off the end of the spring as in Figure 5 as rotation continues. Immediately after snapping off the end of the spring, the springs recoil as illustrated in this figure and in so doing will separate the contacts 40 for a fraction of a second. This construction is provided for minimizing the period of separation between the contacts 40 for desirable purposes which will hereinafter appear.

Practical operation

In the operation of my burner controller, assuming the parts to be in the position of Figure 1, when the room thermostat calls for heat by closing the contacts 38, a circuit from the secondary of the transformer 54 will flow from the terminal $R^1$ through a wire $a$, the contacts 38, a wire $b$, the terminal $R^2$, a wire $c$, the relay coil 10, a wire $d$, the heater 26, the contacts 28 and wires $e$ and $f$ back to the secondary of the transformer. This will cause the armature 14 to be attracted because of energization of the relay coil 10, whereupon the burner contacts 16 are engaged to operate the burner, holding contacts 18 are engaged so that part of the current flowing through the coil 10 will flow through them and through a wire g to the wire f and the contacts 20 are engaged to establish the interrupter circuit from the terminal R¹ through a wire h and wires i and j shunting the room thermostat and including the interrupter contacts 40. If combustion does not occur the current flowing through the heater 26 will open the safety contacts 22 for shutting down operation of the burner until they can be manually reset as described in the Rubel application heretofore referred to. If combustion does occur, the bimetal coil 30 will rotate the rod 32 clockwise for separating the contacts 28 and thus preventing the lockout contacts 22 from separating, as combustion occurring indicates that the burner will operate properly.

Upon separation of the contacts 28, then all the current flowing through the coil 10 flows through the coil 12 and the contacts 18 for holding the relay energized until it is de-energized.

The room thermostat R. T. may be of the simplest character consisting for instance of merely a bimetal coil and a pair of contacts. Where no weights, springs or magnets are used to cause snap action of the thermostat, its differential of operation is very slight, usually less than one-half of one degree Fahrenheit. Accordingly the room thermostat is extremely sensitive to the room temperature and may separate after a minute or so of operation of the burner if the weather is mild. If the room thermostat were the only controlling device for the relay circuit, that is if the contacts 20 and 40 were eliminated, the contacts 38 would have to take care of breaking the circuit through the coils 10 and 12 for thus de-energizing the burner. The room thermostat, however, when of the character described, has but slight power and there is apt to be sticking of the contacts which would change the differential of operation and throw the setting off considerably. Also "chattering" would occur, causing excessive arcing at the contacts and radio interference.

By providing the interrupter contacts 40 and the interrupter holding contacts 20 closed by the relay and these two sets of contacts shunting the room thermostat, when once the room thermostat has closed, its current will be shunted into the contacts 20 and 40. Subsequently, when the contacts 38 open, there is no circuit to break at this point and the burner circuit will be maintained until the pin 52 has assumed the position of Figure 5, whereupon the momentary separation of the contacts 40 deenergizes the coils 10 and 12, thereby stopping the burner and opening the contacts 20 so that when the contacts 40 again engage they cannot establish a circuit to energize the relay.

By rotating the disc 50 about once every three minutes a three minute period of energization for the burner is insured, which gives the fire sufficient time to get a proper start, whereas if the room thermostat were the only controller there might be only a minute or so allowed for the burner to operate, which would be insufficient to cause the fire to get a proper start before the burner was shut off again.

It will be noted that the motor 46 is connected with the terminals M and L². Accordingly it operates only when the burner is operating and will thus stop in the position of Figure 5 whenever the contacts 38 are separated and the contacts 40 become separated which of course will break the relay coil circuit, as before described, and open the contacts 16 for de-energizing the motor 46 as well as the burner. Thus the pin 52 always stops in the position of Figure 5 and must rotate one full revolution before it can separate the contacts 40 and thus insure a predetermined period of time for operation of the burner, or multiples of that period if the contacts 38 of the room thermostat are closed longer than such period.

From the foregoing, it will be obvious that the contacts 40 are the actual circuit breakers for the relay circuit, the contacts 38 operating only to close the circuit and therefore there is no danger of damaging these contacts and thereby changing the differential or setting of the room thermostat. By minimizing the separation period of the contacts 40, the chance for separation of the contacts 38 while the contacts 40 are separated is minimized, this construction being preferred because separation of the contacts 38, while the contacts 40 are separated, would necessarily cause the relay circuit to be broken at the contacts 38. It will therefore be appreciated that the very slight fraction of a second necessary for separation of the contacts 40 is but an infinitely small fraction of the three minute period for rotation of the disc 50 and there is therefore very little chance of the contacts 38 ever actually breaking the relay circuit and yet a control system is provided which is accurately responsive to very slight room temperature changes.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a burner controller, a room thermostat circuit including a room thermostat and a relay coil, a holding coil, holding contacts in circuit with said holding coil and closable by energization of said relay coil, an interrupter and interrupter holding contacts shunting said room thermostat, said interrupter comprising normally closed contacts in series with said interrupter holding contacts and separable periodically, said interrupter holding contacts being associated with said relay coil to close upon energization thereof, contacts for energizing said burner closable by energization of said relay coil, a motor for operating said interrupter, said interrupter motor being included in the circuit with said burner energizing contacts.

2. In a burner controller, a room thermostat circuit including a room thermostat and a relay coil, a holding coil, holding contacts in circuit with said holding coil and closable by energization of said relay coil, an interrupter and interrupter holding contacts shunting said room thermostat, said interrupter comprising normally closed contacts in series with said interrupter holding contacts and separable for an instant only periodically, said interrupter holding contacts being associated with said relay coil to close upon energization thereof, contacts for energizing said burner closable by energization of said relay coil, a motor for operating said interrupter, said interrupter motor being included in the circuit with said burner energizing contacts.

3. In a burner controller, a room thermostat circuit including a room thermostat, a relay coil, electro-responsive means, a normally closed combustion switch openable upon combustion occurring, a holding coil, holding contacts in circuit with said holding coil and closed by energization of said relay coil and an interrupter and interrupter holding contacts shunting said room thermostat, said interrupter comprising normally closed contacts in series with said interrupter holding contacts and separable periodically, said interrupter holding contacts being associated with said relay coil to close upon energization thereof, contacts for energizing said burner closable by energization of said relay coil and delaying means actuated by said electro-responsive means for breaking the circuit through said burner.

4. In a burner controller, a room thermostat circuit including a room thermostat, a relay coil, electro-responsive means, a normally closed combustion switch openable upon combustion occurring, a holding coil, holding contacts in circuit with said holding coil and closed by energization of said relay coil and an interrupter and interrupter holding contacts shunting said room thermostat, said interrupter comprising normally closed contacts in series with said interrupter holding contacts and separable periodically, said interrupter holding contacts being associated with said relay coil to close upon energization thereof, contacts for energizing said burner closable by energization of said relay coil, delaying means actuated by said electro-responsive means for breaking the circuit through said burner and a motor for said interrupter included in the circuit of said burner energizing contacts.

5. In a burner controller for electrically operated burners, a room thermostat of slight differential connected in circuit with the burner to control it, energizing means for said circuit including another circuit, contacts in said another circuit operable upon separation to cause de-energization of said burner, means for periodically separating said contacts, said last means comprising a moving member and said contacts in said another circuit comprising a pair of leaf springs each carrying a contact and said contacts being normally closed and said movable means at one part in its movement engaging one of said springs and snapping off the end thereof whereby the recoil of said springs separates said contacts for an instant.

6. In a burner controller, a room thermostat circuit including a room thermostat and a relay coil, a holding coil, holding contacts in circuit with said holding coil and closable by energization of said relay coil, an interrupter and interrupter holding contacts shunting said room thermostat, said interrupter comprising normally closed contacts in series with said interrupter holding contacts and separable periodically, said interrupter holding contacts being associated with said relay coil to close upon energization thereof, contacts for energizing said burner closable by energization of said relay coil and means for operating said interrupter.

7. In a burner controller, a room thermostat circuit including a room thermostat and a relay coil, a holding coil, holding contacts in circuit with said holding coil and closable by energization of said relay coil, an interrupter and interrupter holding contacts shunting said room thermostat, said interrupter comprising normally closed contacts in series with said interrupter holding contacts and separable for an instant only periodically, said interrupter holding contacts being associated with said relay coil to close upon energization thereof, contacts for energizing said burner closable by energization of said relay coil and means for operating said interrupter.

LAWRENCE M. PERSONS.